United States Patent
Kumar et al.

(10) Patent No.: US 10,671,848 B2
(45) Date of Patent: Jun. 2, 2020

(54) METHODS AND SYSTEMS FOR AUTOMATED PRESENCE VERIFICATION, LOCATION CONFIRMATION, AND IDENTIFICATION OF OBJECTS IN DEFINED ZONES

(71) Applicant: The Boeing Company, Chicago, IL (US)

(72) Inventors: Anil Kumar, Sammamish, WA (US); Guangyu Pei, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 15/951,465

(22) Filed: Apr. 12, 2018

(65) Prior Publication Data

US 2019/0318164 A1    Oct. 17, 2019

(51) Int. Cl.
| | | |
|---|---|---|
| H04N 3/40 | (2006.01) |
| H04N 5/253 | (2006.01) |
| G06K 9/00 | (2006.01) |
| H04W 64/00 | (2009.01) |
| G06K 7/10 | (2006.01) |
| H04N 5/247 | (2006.01) |

(52) U.S. Cl.
CPC ..... *G06K 9/00671* (2013.01); *G06K 7/10475* (2013.01); *G06K 9/00832* (2013.01); *H04W 64/00* (2013.01); *H04N 5/247* (2013.01)

(58) Field of Classification Search
USPC ...................................................... 382/103
See application file for complete search history.

(56) References Cited

U.S. PATENT DOCUMENTS

| | | | |
|---|---|---|---|
| 7,589,636 B2 | 9/2009 | Ayyagari et al. | |
| 8,981,967 B1* | 3/2015 | Shore | B64F 5/00 340/945 |
| 2005/0216938 A1* | 9/2005 | Brady, Jr. | H04L 29/06027 725/76 |
| 2006/0082439 A1* | 4/2006 | Bazakos | G06K 9/00228 340/5.82 |
| 2008/0108261 A1* | 5/2008 | Swan | B63C 9/0005 441/89 |
| 2010/0235037 A1* | 9/2010 | Vian | G07C 5/008 701/31.4 |
| 2014/0210598 A1* | 7/2014 | Mitchell | G06K 7/0008 340/10.5 |

(Continued)

*Primary Examiner* — Stephen P Coleman
(74) *Attorney, Agent, or Firm* — Kwan & Olynick LLP

(57) ABSTRACT

Provided are methods and systems for automated location and identification of multiple objects in an aircraft cabin. A method utilizes a wireless client, RFID reader, and camera, which together form a set. Each set is associated with a specific inspection zone in the cabin. The RFID reader determines the presence of a RFID tag in only one zone. Further, the camera captures an image of that zone. A data feedback is generated based on both the image and the RFID reader response. The data feedback is transmitted by the wireless client to a router and is analyzed to determine the presence of the object in the inspection zone and, if present, the identity of the object. The data feedback is associated with the location of the zone in the aircraft cabin, which is known or may be determined using a set of wireless routers positioned throughout the cabin.

25 Claims, 12 Drawing Sheets

(56) References Cited

U.S. PATENT DOCUMENTS

| | | | |
|---|---|---|---|
| 2015/0271453 A1* | 9/2015 | Chuang | G08B 13/19619 |
| | | | 348/39 |
| 2016/0133137 A1* | 5/2016 | Rencher | G08G 5/0091 |
| | | | 701/537 |
| 2018/0229862 A1* | 8/2018 | Riera | B64F 5/60 |
| 2019/0245810 A1* | 8/2019 | Gulbay | H04L 45/245 |

* cited by examiner

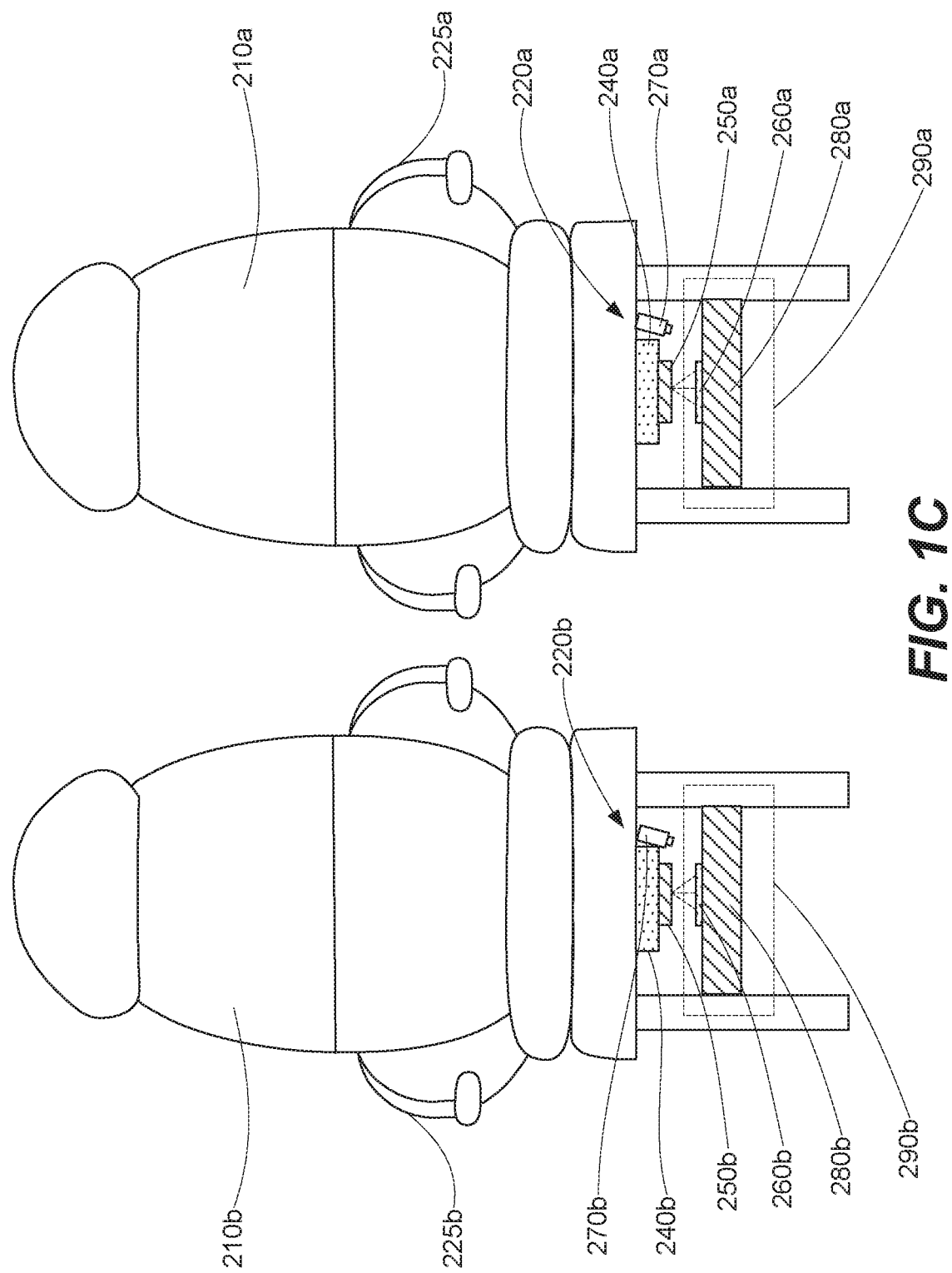

METHODS AND SYSTEMS FOR AUTOMATED PRESENCE VERIFICATION, LOCATION CONFIRMATION, AND IDENTIFICATION OF OBJECTS IN DEFINED ZONES

TECHNICAL FIELD

Disclosed methods and systems relate to the automated presence verification, location confirmation, and identification of objects positioned in defined inspection zones, such as hard-to-access areas inside aircraft cabins.

BACKGROUND

Airlines can face strict regulations concerning the installation, maintenance, and operation of certain safety and other like equipment onboard of aircraft, such as life-vests, also known as personal flotation devices (PFD). For example, a PFD may be stowed in a specially designated area, such as under a seat or in an overhead compartment. The PFD may be used by a passenger during an emergency water landing. Periodic inspections may be used to verify the presence of each PFD in each designated area. In some example, an inspection may involve checking the expiration date and other information associated with each PFD.

Currently, manual inspections of such equipment are performed by airline crew members. Specifically, a crew member may perform a visual check of each designated area, visually confirming the presence of each PFD. This manual inspection may time consuming and labor intensive, especially in modern aircraft designed to fly hundreds of passengers. Yet, airlines try to maintain very strict time schedules and minimize time on the ground. Also, visual verification may be prone to human errors. For example, a crew member may miss one or more designated area or mistakenly identify a wrong object for a PFD.

An alternative to a manual visual inspection may involve equipping PFDs and other like inspected objects with specific devices, such as radio frequency identification (RFID), enabling automated inspection without requiring line of sight during the inspection. However, receiving a response signal from a RFID tag does not confirm that the tag is attached to an inspected object. Furthermore, receiving the response signal does not allow precisely determining the location of the tag and/or the object. A confirmation that all RFID tags are readable inside the aircraft cabin is not sufficient for many types of inspection. For example, it is important to know that all PFDs are present, and not just RFID tags, and that each PFD is present at its designated area. In case of emergency, airline crew members and passengers need to know precise locations of each PFD.

Accordingly, systems and methods for presence verification, location confirmation, and identification of objects within an aircraft cabin are desired.

SUMMARY

Provided are methods and systems for automated location and identification of multiple objects in an aircraft cabin. A method utilizes a wireless client, RFID reader, and camera, which together form a set. Each set is associated with a specific inspection zone in the cabin. The RFID reader determines the presence of a RFID tag in only one zone. Further, the camera captures an image of that zone. A data feedback is generated based on both the image and the RFID reader response. The data feedback is transmitted by the wireless client to a router and is analyzed to determine the presence of the object in the inspection zone and, if present, the identity of the object. The data feedback is associated with the location of the zone in the aircraft cabin, which is known or may be determined using a set of wireless routers positioned throughout the cabin.

Illustrative, non-exclusive examples of inventive features according to present disclosure are described in following enumerated paragraphs:

A1. Method 300 for automated location and identification of multiple objects 280 disposed in aircraft cabin 100, method 300 comprising:
  wirelessly transmitting first data request 402a from first wireless router 230a to first wireless client 240a, wherein:
    first wireless router 230a is one of wireless routers 230 disposed throughout aircraft cabin 100, and
    first wireless client 240a is one of multiple wireless clients 240, each one of multiple wireless clients 240 associated with different one of multiple objects 280;
  transmitting first interrogation signal 408a using first RFID reader 250a, communicatively coupled to first wireless client 240a, wherein first wireless client 240a instructs first RFID reader 250a to transmit first interrogation signal 408a upon receiving first data request 402a at first wireless client 240a;
  monitoring first response signal 412a using first RFID reader 250a, wherein first response signal 412a depends on presence of first RFID tag 260a in first inspection zone 290a and, if present, information encoded on first RFID tag 260a;
  capturing first image 414a of first inspection zone 290a using first camera 270a, communicatively coupled to first wireless client 240a, wherein first wireless client 240a instructs first camera 270a to capture first image 414a of first inspection zone 290a upon receiving first data request 402a at first wireless client 240a;
  generating first data feedback 404a using first wireless client 240a, wherein first data feedback 404a is generated based on first response signal 412a and first image 414a;
  wirelessly transmitting first data feedback 404a from first wireless client 240a to first wireless router 230a; and
  analyzing first data feedback 404a to determine at least one of: presence of first object 280a of multiple objects 280 in first inspection zone 290a, and identification of first object 280a.

A2. Method 300 of paragraph A1, wherein analyzing first data feedback 404a comprises associating first data feedback 404a with the location of first inspection zone 290a in aircraft cabin 100.

A3. Method 300 of paragraph A2, wherein the location of first inspection zone 290a in aircraft cabin 100 is provided from database 295 associated with aircraft cabin 100 and multiple wireless clients 240.

A4. Method 300 of paragraphs A2-A3, wherein analyzing first data feedback 404a comprises determining location of first inspection zone 290a in aircraft cabin 100.

A5. Method 300 of paragraph A4, wherein determining the location of first inspection zone 290a comprises:
  wirelessly transmitting first location request 373a from first wireless router 230a to first wireless client 240a;
  wirelessly transmitting first location feedback 375a from first wireless client 240a to first wireless router 230a, wherein first location feedback 375a is generated by first wireless client 240a upon receipt of first location request 373a from first wireless router 230a;

wirelessly transmitting second location request 373b from second wireless router 230b to first wireless client 240a;

wirelessly transmitting second location feedback 375b from first wireless client 240a to second wireless router 230b, wherein second location feedback 375b is generated by first wireless client 240a upon receipt of second location request 373b from second wireless router 230b; and analyzing first location feedback 375a, second location feedback 375b, location of first wireless router 230a in aircraft cabin 100, and location of second wireless router 230b in aircraft cabin 100 to determine the location of first inspection zone 290a.

A6. Method 300 of paragraphs A4-A5, wherein determining location of first inspection zone 290a comprises validating location of first inspection zone 290a using an expected location area of first inspection zone 290a.

A7. Method 300 of paragraphs A1-A6, wherein analyzing first data feedback 404a comprises analyzing first image 414a in first data feedback 404a to determine at least presence of first object 280a.

A8. Method 300 of paragraphs A1-A7, wherein analyzing first data feedback 404a further comprises comparing results of analyzing first image 414a with first response signal 412a.

A9. Method 300 of paragraphs A1-A8, wherein:
analyzing first data feedback 404a comprises generating report 205 validating the presence of first object 280a in first inspection zone 290a and the identification of first object 280a; and
if one of the presence of first object 280a in first inspection zone 290a or the identification of first object 280a does not meet corresponding predetermined criteria, report 205 comprises instructions to manually inspect first inspection zone 290a.

A10. Method 300 of paragraph A9, wherein the predetermined criteria comprise at least one of an indicium associated with first object 280a and an expiration date associated with first object 280a.

A11. Method 300 of paragraph A9, wherein report 205 is generated using off-board controller 210 positioned outside of aircraft cabin 100.

A12. Method 300 of paragraph A9, further comprising, if report 205 comprises instructions to manually inspect first inspection zone 290a, manually inspecting first inspection zone 290a.

A13. Method 300 of paragraph A9, wherein report 205 comprises validation of the presence of each one of multiple objects 280 disposed in aircraft cabin 100 and the identification of each one of multiple objects 280.

A14. Method 300 of paragraphs A1-A13, further comprising:
wirelessly transmitting second data request 402b from second wireless router 230b to second wireless client 240b, wherein:
the second wireless router 230b is one of wireless routers 230, and
the second wireless client 240b is one of wireless clients 240,
transmitting second interrogation signal 408b using second UM reader 250b, communicatively coupled to second wireless client 240b, wherein second wireless client 240b instructs second RFID reader 250b to transmit second interrogation signal 408b upon receiving second data request 402b at first wireless client 240b;

monitoring second response signal 412b using second RFID reader 250b, wherein:
the second response signal 412b depends on presence of second RFID tag 260b and information encoded on second RFID tag 260b in second inspection zone 290b, and
the second inspection zone 290b does not overlap with first inspection zone 290a;
capturing second image 414b of second inspection zone 290b using second camera 270b, communicatively coupled to second wireless client 240b, wherein second wireless client 240b instructs second camera 270b to capture second image 414b of second inspection zone 290b upon receiving second data request 402b at second wireless client 240a;
generating second data feedback 404b using second wireless client 240b, wherein second data feedback 404b is generated based on second response signal 412b and second image 414b;
wirelessly transmitting second data feedback 404b from second wireless client 240b to second wireless router 230b; and
analyzing second data feedback 404b to determine at least one of: presence of second object 280b of multiple objects 280 in second inspection zone 290b, and identification of second object 280b.

A15. Method 300 of paragraph A14, wherein monitoring second response signal 412b using second RFID reader 250b and monitoring first response signal 412a using first RFID reader 250a overlap in time.

A16. Method 300 of paragraph A14, wherein analyzing first data feedback 404a and analyzing second data feedback 404b overlap in time and are performed using one controller.

A17. Method 300 of paragraphs A1-A16, wherein wirelessly transmitting first data request 402a from first wireless router 230a to first wireless client 240a is performed over a 60 GHz network.

A18. Method 300 of paragraphs A1-A17, wherein first inspection zone 290a is one of space under seat 110 or the space in overhead compartment 120 in aircraft cabin 100.

A19. Method 300 of paragraphs A1-A18, wherein first object 280a is a life-west.

A20. Method 300 of paragraph A1-A19, further comprising wirelessly transmitting 520 inflight entertainment data from first wireless router 230a to first wireless client 240a.

B1. Identification system 200 for automated location and identification of multiple objects 280 disposed in aircraft cabin 100, identification system 200 comprising:
first wireless router 230a, positioned in aircraft cabin 100;
second wireless router 230b, positioned in aircraft cabin 100;
first wireless client 240a, positioned in aircraft cabin 100 closer to first wireless router 230a than to second wireless router 230b, wherein first wireless client 240a is configured to wireless communicate with first wireless router 230a and with second wireless router 230b;
second wireless client 240b, positioned in aircraft cabin 100 closer to second wireless router 230b than to first wireless router 230a, wherein second wireless client 240b is configured to wireless communicate with first wireless router 230a and with second wireless router 230b;
first RFID reader 250a, communicatively coupled to first wireless client 240a, wherein first RFID reader 250a defines first inspection zone 290a;
second RFID reader 250b, communicatively coupled to second wireless client 240b, wherein second RFID reader 250b defines second inspection zone 290b, not overlapping with first inspection zone 290a;

first camera 270a, communicatively coupled to first wireless client 240a and configured to capture the image of first inspection zone 290a; and second camera 270b, communicatively coupled to second wireless client 240b and configured to capture the image of second inspection zone 290b.

B2. Identification system 200 of paragraph B1, wherein:

first wireless client 240a is configured to generate first data feedback 404a from first response signal 412a received from first RFID reader 250a and first image 414a received from first camera 270a; and second wireless client 240b is configured to generate second data feedback 404b from second response signal 412b received from second RFID reader 250b and second image 414b received from second camera 270b.

B3. identification system 200 of paragraph B2, further comprising controller 201 communicatively coupled to first wireless router 230a and to second wireless router 230b, wherein:

the controller 201 is configured to analyze first data feedback 404a received from first wireless client 240a to determine at least one of: presence of first object 280a of multiple objects 280 in first inspection zone 290a, and identification of first object 280a; and the controller 201 is configured to analyze second data feedback 404b received from second wireless client 240b to determine at least one of: presence of second object 280b of multiple objects 280 in second inspection zone 290b, and identification of second object 280b.

B4. Identification system 200 of paragraph B3, wherein controller 201 is off-board controller 210 positioned outside of aircraft cabin 100.

B5. Identification system 200 of paragraph B3, wherein controller 201 is further configured to associate first data feedback 404a with location of first inspection zone 290a and to associate second data feedback 404b with location of second inspection zone 290b.

These and other embodiments are described further below with reference figures.

BRIEF DESCRIPTION OF THE DRAWINGS

The disclosure may best be understood by reference to the following description taken in conjunction with the accompanying drawings, which illustrate various embodiments of the disclosure.

FIG. 1C is a schematic representation of two aircraft seats, each equipped with a set of components of the identification system for determining the location and identification of an object under each seat, in accordance with some embodiments.

DETAILED DESCRIPTION

Figures 1A, 1B:
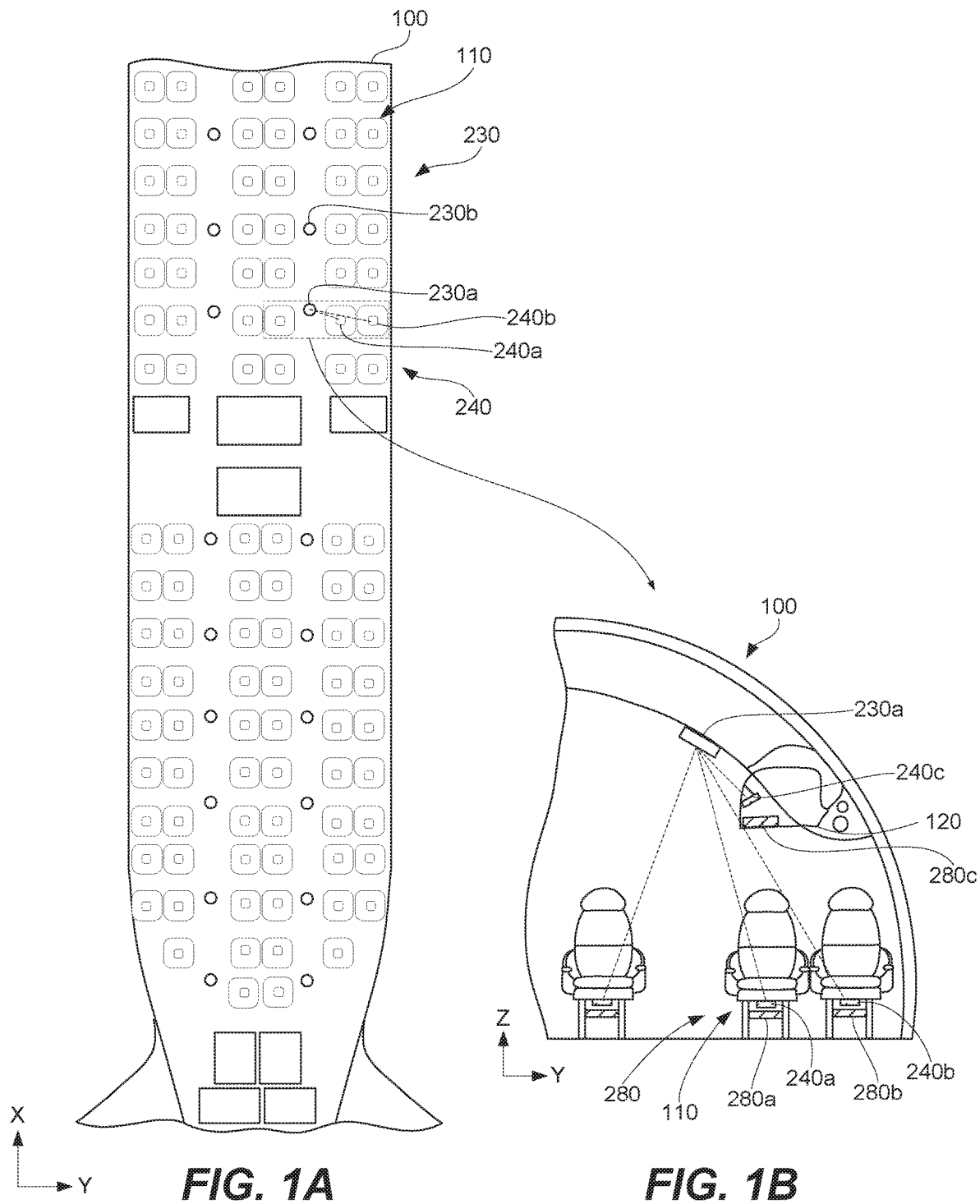
FIG. 1A is a top cross-sectional view of a passenger aircraft cabin, showing wireless routers and wireless clients of an identification system, in accordance with some embodiments.
FIG. 1B is a side view of a section of the aircraft cabin shown in FIG. 1A, in accordance with some embodiments.

In the following description, numerous specific details are set forth in order to provide a thorough understanding of the presented concepts. The presented concepts may be practiced without some, or all, of these specific details. In other instances, well known process operations have not been described in detail to not unnecessarily obscure the described concepts. While some concepts will be described with the specific embodiments, it will be understood that these embodiments are not intended to be limiting.

Introduction

Manual inspection of various objects inside an aircraft cabin takes substantial time and effort requiring airline crew members to access and visually inspect various parts of the aircraft cabin. For example, areas under passenger seats and some overhead compartments may be inspected by crew members to verify the presence of safety devices, such as PFDs. Manual inspections may also be prone to human error. Yet, many modern aircraft are designed to transport hundreds of passengers, and the amount of time allowed between flights should be kept to a minimum. Further, modern aircraft allow for different seating arrangements, which be reconfigured by airlines based on their current needs. Therefore, tracking the location of each seat as well as the number and individual locations of all PFDs in the cabin can be challenging.

Various technologies, such RFID, provide some level of automation during the detection, identification, and tracking of objects without requiring line of sight. However, these technologies have been primarily developed to the needs of other industries and environments, which are often quite different from aircraft cabins. For instance, a traditional RFID reader is able to scan many tags in a large area but is not capable of determining precise location of each tag. At the same time, simply determining that all RFID tags, associated with PFDs, are present in an aircraft cabin is far from being sufficient. For example, an RFID tag can be separated from a PFD, and the PFD can be removed from the aircraft. In the same or other example, a PFD with a tag can be placed in a different area (e.g., misplaced). Even though this PFD is still present in the cabin, it may not be easily found in case of an emergency. As such, implementations of traditional RFID systems, as described above, in unique environments of aircraft cabins have been limited.

Provided are methods and systems for automated location and identification of objects in defined inspection zones throughout an aircraft cabin. Various operations of a method may controlled on-board of the aircraft (e.g., by an on-board controller) or using an off-board controller. In some embodiments, all operations may be completed without any inspection personnel being present in the aircraft cabin. The method may be performed as a part of the pre-flight check.

The method involves wirelessly transmitting a data request from a wireless router to a wireless client. At other times, this wireless router and client may be use for inflight entertainment and other purposes. The data request triggers various operations of components communicatively coupled to the wireless client, such as an RFID reader and a camera. The wireless client, RFID reader, and camera form a set associated with a specific inspection zone such that each of multiple inspection zones in the aircraft cabin has its own dedicated set. The wireless client is used to identify the location of the zone. The RFID reader is configured to scan for RFID tags in that specific zone and not in other zones. Finally, the camera is configured to capture the image of the zone.

It should be noted that the aircraft cabin may include multiple sets of wireless clients, RFID readers, and cameras. As noted above, each set is associated with a different inspection zone. Each inspection zone may be expected to have one or more objects, such as a PFD. Each set may operate in parallel with any other set in the same aircraft cabin. Collectively, all sets communicate (through wireless routers) with a central controller configured to analyze multiple data feedbacks and present a comprehensive report, e.g., all objected have been positively detected, located, and identified or one or more objects require manual verification.

Returning to operations of the method, based on the data request, the RFID reader transmits an interrogation signal to the inspection zone and monitors a response signal. The response signal depends on the presence of a REID tag in the inspection zone. The RFID tag is expected to be attached to an object, which is expected to be present in the inspection zone. However, the RFID tag, the object, or both may not present in the inspection zone. Furthermore, in some instances, the RFID tag may be present in the inspection zone, but still not detected by the RFID reader. As such, the response signal, which indicates that the RFID tag is present in the inspection zone, does not necessarily indicate that the object is also in this zone, and vice versa. As such, additional inspection of the zone is needed to confirm the presence and identity of the object in the zone.

Based on the data request, the camera captures an image of the inspection zone. As such, the wireless client received two data references about the inspection zone, one from the RFID reader and one from the camera. A combination of these data references allows confirming the presence and identity of the object in the zone.

A data feedback is generated based on both the response signal from the RFID reader and the image captured by the camera. The data feedback is then transmitted from the wireless client to the wireless router. The wireless client may be able to communicate with multiple wireless routers. As further described below, these multiple wireless routers may be also used to determine the location of the wireless client and, more specifically, the location of the inspection zone associated with this wireless client. The communication between the wireless routers and the wireless client may be performed using a 60 GHz wireless network. The same network as well as the wireless routers and the wireless client may be also used for transmitting IFE content when the automated location and identification method is not performed.

The data feedback, received from the wireless client, is analyzed to determine the presence of the object in the inspection zone and, if present, to identify the object located. For example, the response signal obtained by the RFID reader may include a particular code from the RFID tag corresponding to a particular PFD. The image obtained by the camera may show at least a portion of the PFD. This image may be used to confirm the presence of the PFD and its identification as a PFD, rather than some other object. As noted above, a combination of the RFID response signal and image is used to confirm, for example, that the PFD is in fact present in the inspection zone.

In another example, the response signal may include a code from a RFID tag, but the image may not show a PFD. This information may indicate that the RFID tag has been separated from the PFD, but the RFID tag is still present in the inspection zone. In this example, an inspector (e.g., a crew member) may be instructed to manually inspect that particular inspection zone. Furthermore, the inspector may be instructed to retrieve the RFID tag, reattach it to a replacement PFD, place the PFD with the attached tag into the inspection zone, and, in some embodiments, execute the method again until all inspection zones are confirmed.

In yet another example, the response signal may not include a code from an RFID tag, but the image may show a PFD. This example may indicate that the RFID tag is either missing from the inspection zone or is not readable. For example, another object (e.g., metal, liquid) may interfere with the interrogation signal and/or the response signal and make the RFID tag unreadable. Again, the inspector (e.g., a crew member) may be instructed to manually inspect the inspection zone and, for example, to provide a new RFID tag, replace the existing unreadable RFID tag, adjust the existing tag, or repair the RFID tag. The method may be executed again until all inspection zones are confirmed.

In another example, the response signal may fail to include a code from a RFID tag and the image may not show a PFD. As in other the previous examples described above, the inspector (e.g., a crew member) may also be instructed to manually inspect the inspection zone and, in some cases, place a PFD with an attached RFID tag to the inspection zone. In general, the system may instruct the inspector to perform a corrective action until all RFID tags are readable, all images show expected objects, and each combination of RFID response signals and image corresponds to a particular inspection zone. The above examples indicate how a specific combination and implementation of wireless communication, RFID technology, digital image capture and processing can be used to address inspection challenges in an aircraft cabin environment.

To provide some context for various features of the methods and systems described herein, FIG. 1A illustrates a top cross-sectional plan view of aircraft cabin 100. Aircraft cabin 100 may include various internal equipment, fixtures, and furnishings, which may be arranged in one or more layouts or configurations. For instance, passenger seats, galleys, crew quarters, lavatories, and bulkheads may be arranged to accommodate various passenger classes, e.g., first, business, coach and economy coach, areas and various other service access requirements. Passenger seats are generally arranged or positioned in a configuration that permits convenient access to an aisle from, for example, no more than two or three seats away. Seats are grouped together and separated by defined intervals, or distances, to provide for sufficient space to, for example, accommodate passengers' legs, deploy of in-flight entertainment (IFE) screens, fold trays or tables, and recline seats. In various passenger class areas, seats and spacing between seat assemblies may vary pursuant to configuration goals, e.g., maximum occupancy, comfort, convenience, luxury, etc. Thus, equipment within aircraft cabin 100 may be configured to accommodate specific aircraft service goals. Aisles formed between seating arrangements define paths that may each include a defined starting and ending point, permitting crew members to cross aircraft cabin 100 to address passenger needs and to provide service. One of ordinary skill in the art will appreciate that FIG. 1A is illustrative and that other configurations or orientations of seats and other equipment within aircraft cabin 100 may exist.

FIG. 1A also illustrates wireless routers 230 and wireless clients 240 disposed throughout aircraft cabin 100. Wireless routers 230 and wireless clients 240 form a wireless network, such that one or more wireless routers 230 may wirelessly communicate with one or more wireless clients 240. For example, first wireless router 230a may communicate with both first wireless client 240a and second wireless client 240b. Second wireless router 230b may also communicate with both first wireless client 240a and second wireless client 240b, e.g., for determining position of first wireless client 240a and second wireless client 240b in aircraft cabin 100. As further described below, wireless routers 230 and wireless clients 240 may be a part of the IFE system of the aircraft in addition to being used for automated location and identification of multiple objects 280.

While only two wireless routers (i.e., first wireless router 230a and second wireless router 230b) are identified in FIG. 1A, one having ordinary skill in the art would understand that any number of wireless routers can be used in the same aircraft cabin. In some embodiments, wireless routers 230 are positioned in aircraft cabin 100 in such a way to provide wireless communication with each of wireless clients 240 present in aircraft cabin 100. Furthermore, the location of wireless routers 230 may be such that specific location of each one of wireless clients 240 in aircraft cabin 100 can be determined. For example, the location of each of wireless clients 240 may be identified as associated with each individual seat in aircraft cabin 100. While only two wireless clients (i.e., first wireless client 240a and second wireless client 240b) are identified in FIG. 1A, one having ordinary skill in the art will appreciate that any number of wireless clients 240 can be used.

FIG. 1B illustrates a front view of a portion of aircraft cabin 100 shown in FIG. 1A, showing seats 110 and objects 280 disposed either under seats 110 or in overhead compartment 120. Some examples of objects 280 are PFDs, oxygen generators, seat power boxes, medical equipment, food items, and the like. While the following description focuses on PFDs, as examples of objects 280, one having ordinary skills in the art would understand that any other types of objects are also within this scope.

FIG. 1B also illustrates first wireless client 240a, second wireless client 240b, and third wireless client 240c. First wireless client 240a is associated with and positioned in the same general areas as first object 280a, which is under the seat in this particular example. Second wireless client 240b is associated with and positioned in the same general areas as second object 280b, which is also under the seat in this example. Third wireless client 240c is associated with and positioned in the same general areas as third object 280c, which is also in overhead compartment 120 in this example. This association is referred to as to one-to-one relationship between the equipment used to automatically locate and identify the object and the object itself. Because of this relationship and, in some example, because of the actual proximity of the wireless client to the object, the location of the wireless client may be associated with the location of the object or, more specifically, with the location of the inspection zone where the object is expected. The location of each wireless client may be know or determined using wireless routers 230. Finally, FIG. 1C illustrates first wireless router 230a operable to communication with each of first wireless client 240a, second wireless client 240b, and third wireless client 240c.

FIG. 1C illustrates additional details and components associated with each inspection zone. In this example, first inspection zone 290a is shown to include first object 280a and first REM tag 260a attached to first object 280a. As described above, in some instances, first object 280a and/or first REM tag 260a may be missing from first inspection zone 290a, and the method is designed to determined such instances.

First inspection zone 290a is associated with first RFID reader 250a, first camera 270a, and first wireless client 240a. In fact, first RFID reader 250a and first camera 270a may define first inspection zone 290a. For example, first inspection zone 290a may be a field of view of first camera 270a and/or scan zone of first RFID reader 250a. A combination of first RFID reader 250a, first camera 270a, and first wireless client 240a is referred to as first set 220a.

Likewise, in this example, second inspection zone 290b is shown to include second object 280b and second REID tag 260b attached to second object 280b. in some instances, second object 280b and/or second RFID tag 260b may be missing from second inspection zone 290b. Second inspection zone 290b is associated with second RFID reader 250b, second camera 270b, and second wireless client 240b. A combination of second RFID reader 250b, second camera 270b, and second wireless client 240b is referred to as second set 220b.

The one-to-one relationship, described above, provides that components of first set 220a do not relate to or operable in second inspection zone 290b. Likewise, components of second set 220b do not relate to or operable in first inspection zone 290a. For example, second inspection zone 290b is outside of the range of first RFID reader 250a and not within the field of view of first camera 270a. The one-to-one relationship applies to all sets in aircraft cabin 100, e.g., a third set, a fourth set, etc. This relationship and independent operation of each set allow controller 201 to obtain distinct data representative of each inspection zone and analyze this data separately.

Identification System Examples

Figure 2A:
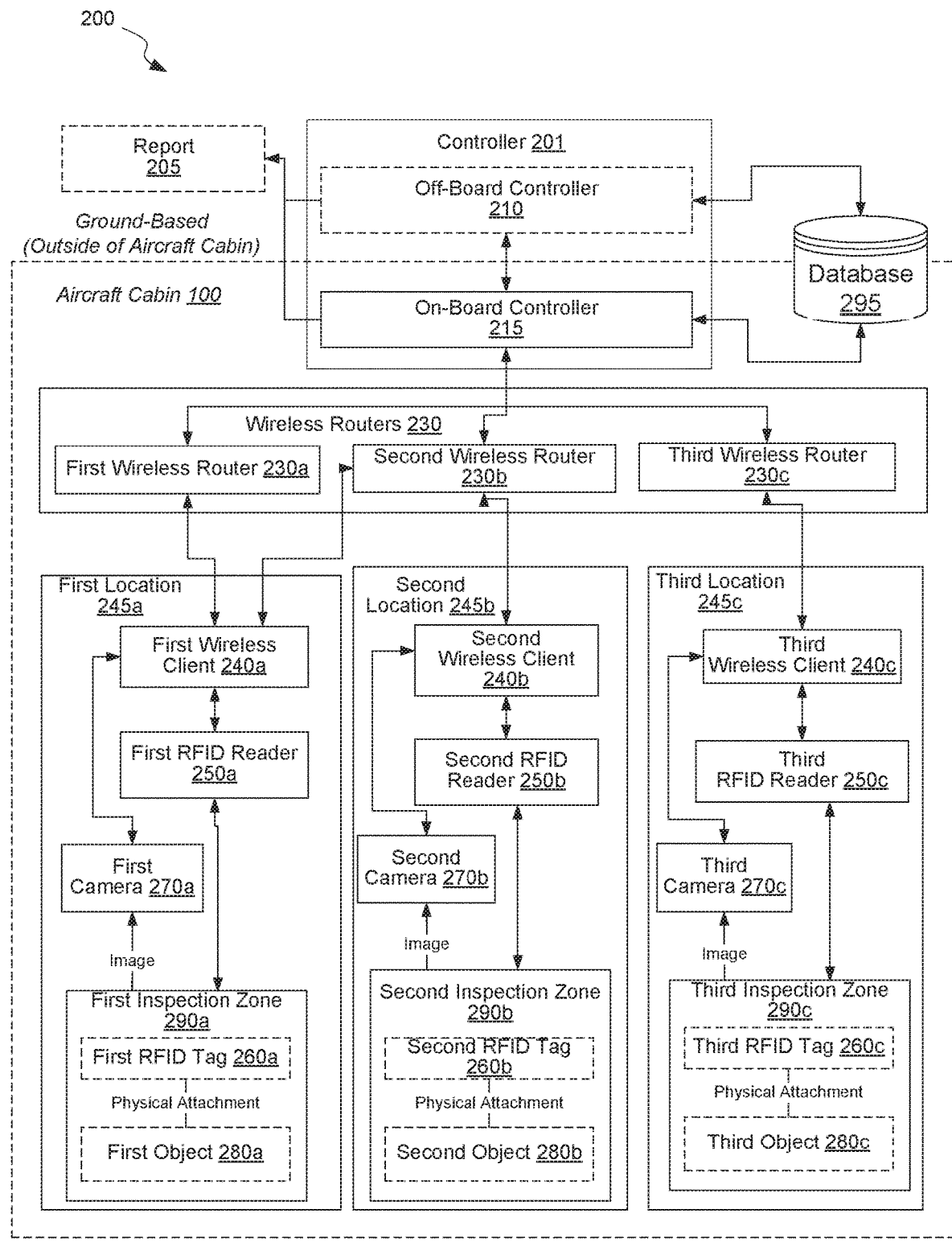
FIG. 2A is a block diagram of the identification system, showing various components and data connections between these components used for automated location and identification of multiple objects in an aircraft cabin, in accordance with some embodiments.

FIG. 2A is a block diagram of identification system 200, showing various components and connections between these components used for automated location and identification of multiple objects 280 disposed in aircraft cabin 100. In some embodiments, identification system 200 includes controller 201, which may be off-board controller 210, on-board controller 215, or a combination of both off-board controller 210 and on-board controller 215. For example, off-board controller 210 may be positioned outside of aircraft cabin 100 (e.g., on the ground) and may electronically communicate with on-board controller 215 and/or directly with wireless routers 230. On-board controller 215 may be positioned inside aircraft cabin 100 cabin and may communicate directed with wireless routers 230 and, if present, with off-board controller 210. In some embodiments, either off-board controller 210 or on-board controller 215 is the only controller of identification system 200.

Controller 201 may receive data feedbacks from wireless routers 230, analyze these data feedbacks, and generate report 205. Report 205 indicates the presence (or absence), location, and identification of multiple objects 280 inside aircraft cabin 100. In some embodiments, at least a part of this analysis is performed by wireless clients 240.

Identification system 200 may also include database 295. Database 295 may be outside of aircraft cabin 100 (e.g., on the ground or, more specifically, a part of off-board controller 210), in aircraft cabin 100 (e.g., a part of on-board controller 215), or be present in both locations. Database 295 may store various data and provide this data to controller 201 for its analysis of various data feedbacks received from first wireless router 230a. For example, database 250 may store reference images (e.g., used for visual analysis), location of each inspection zone, RFID codes, and the like. Furthermore, database 295 may be used to store reports 205 generated by identification system 200.

Identification system 200 includes wireless routers 230 forming a wireless network in aircraft cabin 100 and communicate with wireless clients 240, such as first wireless client 240a, second wireless client 240b, and third wireless client 240c shown in FIG. 2A. Wireless routers 230 may receive instructions and provide output to controller 201.

Wireless routers 230 may be 60-GHz routers and may also be used by the WE system as, further described below. Wireless routers 230 may be IEEE 802.11ad compatible and may have multiple channels, e.g., a first channel operating at 57 GHz-59.4 GHz, a second channel operating at 59.4 GHz-61.56 GHz, a third channel operating at 61.56 GHz-63.72 GHz, and a fourth channel operating at 63.72 GHz-65.88 GHz. Overall, the 60 GHz wireless protocol ranges from frequencies as low as 57 GHz to as high as 64 GHz. These frequencies are significantly higher than those used by many other wireless protocols, such as LTE (e.g., which operates from 0.7 GHz to 2.6 GHz) or Wi-Fi (e.g., which operates at 2.4 GHz or 5 GHz). This difference results in 60 GHz networks having various technical advantages when compared to other network protocols like Wi-Fi. Specifically, the higher frequency allows increasing network bandwidth and effective data rates, which may be important for transferring high resolution images of all inspection zones in aircraft cabin 100 and performing these transfers in a fast manner. Furthermore, 60 GHz wireless telecommunication systems may be suited for streaming of high-definition video (e.g., as a part of the IFE system) without compression and large data transfers (e.g., transfer rates above 1000 Mbps). Finally, a combination of short range and large bandwidth of 60 GHz networks precisely allow determining individual location of each one of wireless clients 240 and corresponding inspection zones.

Each wireless client is placed a specific location corresponding to a different inspection zone. For instance, first wireless client 240a has first location 245a, corresponding to first inspection zone 290a. In some examples, first location 245a may be within first inspection zone 290a, but it does not have to be. Second wireless client 240b has second location 245b, corresponding to second inspection zone 290b. Third wireless client 240c has third location 245c, corresponding to third inspection zone 290c. Because of this correspondence, determining the location of first wireless client 240a in aircraft cabin 100, which is first location 245a, also determines the location of first inspection zone 290a.

Determining the location of first wireless client 240a in aircraft cabin 100 may be performed using wireless routers 230, as further described below with reference to FIGS. 3C and 3D. FIG. 2A illustrates communication lines between first wireless client 240a and first wireless router 230a and between first wireless client 240a and second wireless router 230b.

Referring to FIG. 2A, first wireless client 240a is communicatively coupled to first RFID reader 250a and first camera 270a, all three being present in first location 245a. For example, each of first RFID reader 250a and first camera 270a may be wirelessly connected or connected using wires with first wireless client 240a. The connection between first RFID reader 250a and first wireless client 240a may be independent from the connection between first camera 270a and with first wireless client 240a. The scan zone of first RFID reader 250a and the field of view of first camera 270a define first inspection zone 290a. First RFID reader 250a is operable to detect presence of RFID tags in first inspection zone 290a and, if a tag is present, to obtain a code encoded on this tag. The scan zone of first RFID reader 250a is limited to first inspection zone 290a and excludes other inspection zones, such as second inspection zone 290b and third inspection zone 290c.

In some embodiments, the tag may be a passive tag. First RFID reader 250a may operate in a number of frequency bands, such as 120-150 kHz (an example of low frequency RFID), 13.56 MHz (an example of high frequency RFID), 433 MHz, 865-868 MHz, 902-928 MHz (three examples of ultra-high frequency RFID), 2450-5800 MHz, 3.1-10 GHz (two examples of microwave frequency RFID), and the like. The RFID frequency should not be confused with a frequency of the wireless network by wireless routers 230, which is in the 60-GHz range.

First camera 270a may be a digital camera operable to take an image of first inspection zone 290a. First camera 270a may have a light source (e.g., a flash) to illuminate first inspection zone 290a while the image is being captures. It should be noted that some inspection zones may be poorly lit (e.g., under passenger seats, closed overhead compartments). In some examples, first camera 270a may have some image processing capability, for example, to determine if the capture image represents an intended object. In some embodiments, an objected expected in first inspection zone 290a may be a PFD, which typically has an orange color. First camera 270a may analyze the image to determine the presence of orange color in the image. More specifically, a number of pixels corresponding to a particular wavelength range may be compared to the total number of pixels. Other images analysis techniques are also within the scope.

Second location 245b and third location 245c may be similar to first location 245a and contain similar sets of components operable to automated location and identification of second object 280b in second inspection zone 290b and third object 280c in third inspection zone 290c. Specifically, second location 245b includes second wireless client 240b, second RFID reader 250b communicatively coupled to second wireless client 240b, and second camera 270b also communicatively coupled to second wireless client 240b. Each of second RFID reader 250b and second camera 270b may be wirelessly connected or connected using wires with second wireless client 240b. Second RFID reader 250b and second camera 270b define second inspection zone 290b, which may include second object 280b and/or second RFID tag 260b. Likewise, third location 245c includes third wireless client 240c, third RFID reader 250c communicatively coupled to third wireless client 240c, and third camera 270c also communicatively coupled to third wireless client 240c. Third RFID reader 250c and third camera 270c define third inspection zone 290c, which may include third object 280c and/or third RFID tag 260c.

Corresponding data flows in identification system 200 with now be briefly described with reference to FIG. 2B to better describe functionality of identification system 200. When the identification method is initiated, first wireless router 230a wirelessly transmits first data request 402a to first wireless client 240a. Once first data request 402a is received by first wireless client 240a, first wireless client 240a may activate first RFID reader 250a and first camera 270a. Specifically, first wireless client 240a instructs first RFID reader 250a to transmit first interrogation signal 408a upon receiving first data request 402a at first wireless client 240a. First RFID reader 250a then transmits first interrogation signal 408a to first inspection zone 290a and monitors first response signal 412a. First wireless client 240a also instructs first camera 270a to capture first image 414a of first inspection zone 290a upon receiving first data request 402a at first wireless client 240a. First camera 270a captures first image 414a of first inspection zone 290a. First data feedback 404a is then generated based on first response signal 412a and first image 414a and is transmitted by first wireless client 240a to first wireless router 230a.

Likewise, second wireless router 230b wirelessly transmits second data request 402b to second wireless client 240b. Upon receipt of second data request 402b, second wireless client 240b activates second RFID reader 250b and second camera 270b. Specifically, second wireless client 240b instructs second RFID reader 250b to transmit second interrogation signal 408b upon receiving second data request 402b at second wireless client 240b. Second RFID reader 250b transmits second interrogation signal 408b into second inspection zone 290b and monitors second response signal 412b. Second wireless client 240b also instructs second camera 270b to capture second image 414b of second inspection zone 290b upon receiving second data request 402b at second wireless client 240b. Second camera 270b captures second image 414b of second inspection zone 290b. Second data feedback 404b is generated based on second response signal 412b and second image 414b and is transmitted by second wireless client 240b to second wireless router 230b.

Figure 2B:
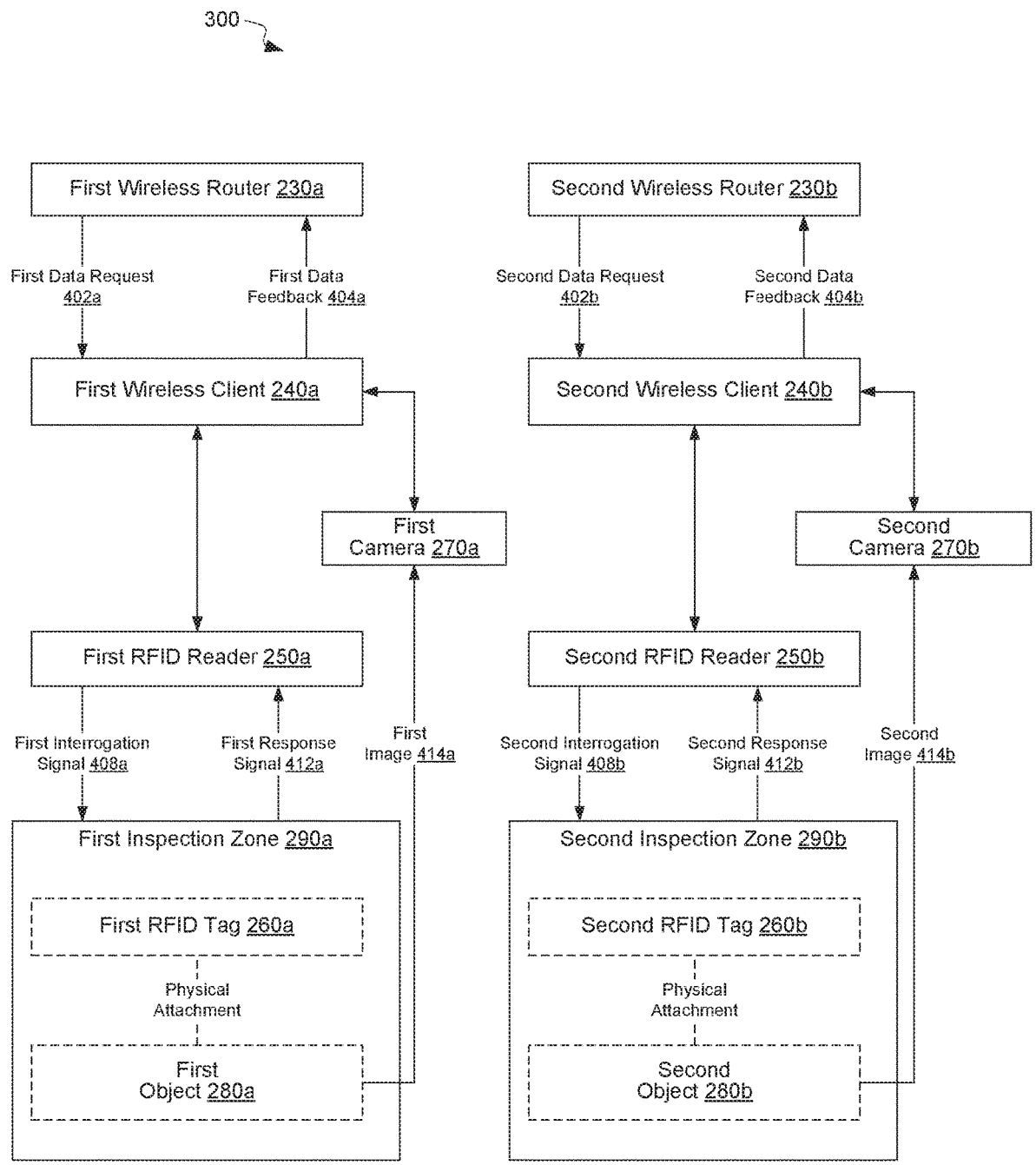
FIG. 2B is a schematic representation of the identification system components and data pathways, in accordance with some embodiments.

While only two sets of identification system 200 are shown in FIG. 2B, one having ordinary skills in the art would understand that any number of sets can be used and operated in a similar manner. The number of sets depends on the number of inspection location, such that each location has its own component set. Each set may be operated independently and/or simultaneously with other sets.

Identification Method Examples

Figure 3A:
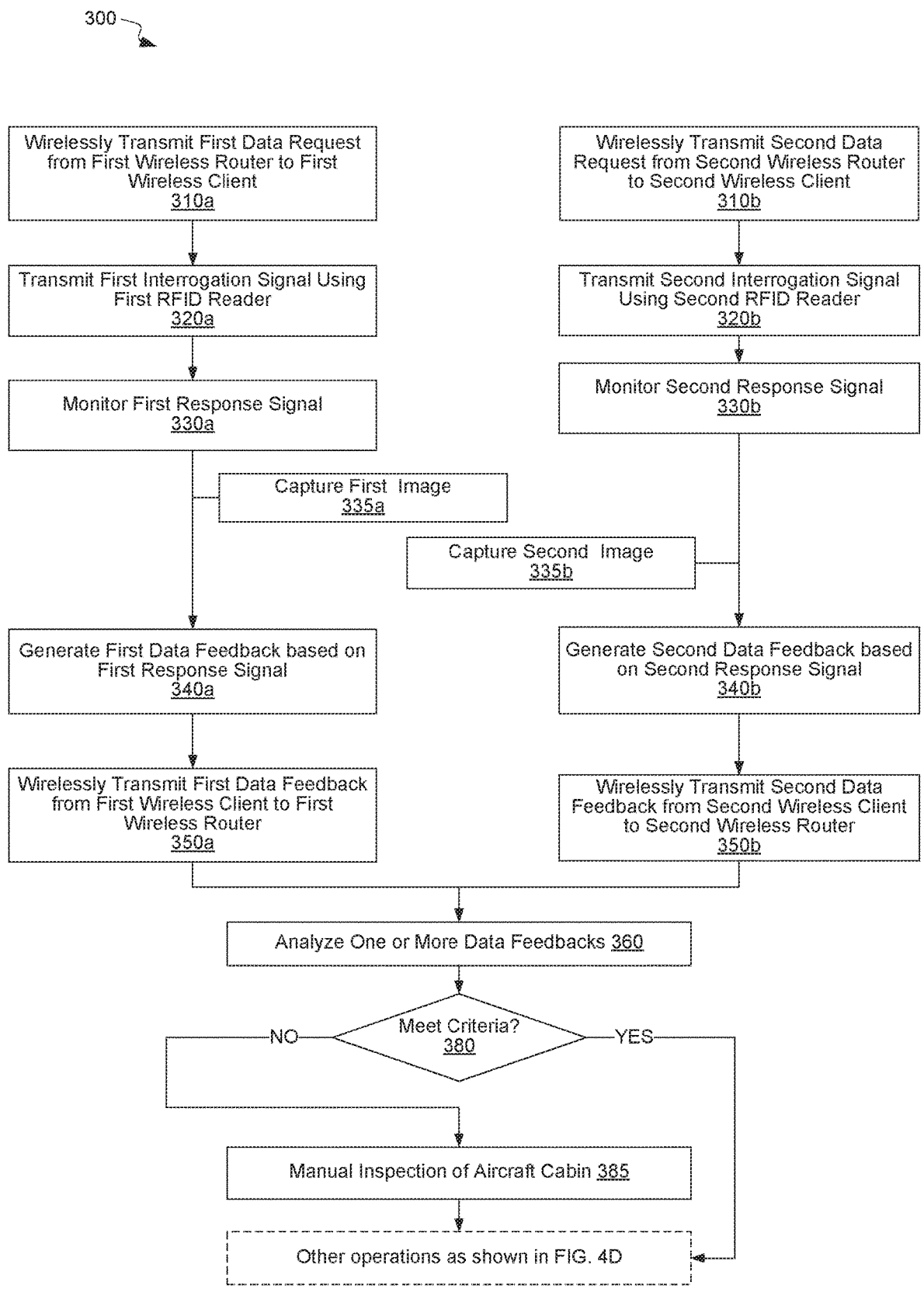
FIG. 3A is a process flowchart corresponding to a method for the automated location and identification of multiple objects in an aircraft cabin, in accordance with some embodiments.

FIG. 3A is a process flowchart corresponding to method 300 for automated location and identification of multiple objects 280 disposed or expected to be disposed in aircraft cabin 100. Method 300 may commence with wirelessly transmitting (referring to block 310a in FIG. 3A) first data request 402a from first wireless router 230a to first wireless client 240a. For example, first wireless router 230a may initiate this operation in response to instructions received from controller 201. First data request 402a is transmitted over a 60-GHz network provided by wireless routers 230 disposed throughout aircraft cabin 100. First wireless router 230a is one of these wireless routers 230. First wireless client 240a is one of wireless clients 240, described above with reference to FIG. 2A. First wireless client 240a has a specific location associated with first inspection zone 290a. For example, first wireless client 240a may be positioned in a sear or an overhead compartment.

Method 300 proceeds with transmitting (referring to block 320a in FIG. 3A) first interrogation signal 408a using first RFID reader 250a. This operation may be triggered upon receipt of first data request 402a from first wireless router 230a by first wireless client 240a. Specifically, first wireless client 240a may instruct first RFID reader 250a to transmit first interrogation signal 408a upon receiving first data request 402a at first wireless client 240a. Various examples of first RFID reader 250a are described above with reference to FIG. 2A. First RFID reader 250a is positioned in the same location as first wireless client 240a and is communicatively coupled to first wireless client 240a. First interrogation signal 408a is transmitted to first inspection zone 290a.

Method 300 then proceeds with first RFID reader 250a monitoring (referring to block 330a in FIG. 3A) first response signal 412a. First response signal 412a depends on the presence of first RFID tag 260a in first inspection zone 290a and, if present, based on the information encoded on first RFID tag 260a. For example, first RFID tag 260a may include 64 bits, 96 bits, or other amount of data encoded on the tag. This information may be associated with the type of first object 280a, expiration date of first object 280a, and the like. First RFID tag 260a is expected to be attached to first object 280a and both are expected to be present in first inspection zone 290a. However, additional information, besides first response signal 412a, is used to confirm that first object 280a is in fact present in first inspection zone 290a. For example, first RFID tag 260a may be separated from first object 280a, and first object 280a may be removed from first inspection zone 290a. In this example, first response signal 412a still indicates that first RFID tag 260a is present in first inspection zone 290a. However, first object 280a is not in first inspection zone 290a.

Method 300 also involves capturing (referring to block 335a in FIG. 3A) first image 414a of first inspection zone 290a using first camera 270a. This operation may be triggered by first wireless client 240a. Specifically, first wireless client 240a may instruct first camera 270a to capture first image 414a of first inspection zone 290a upon receiving first data request 402a at first wireless client 240a. Examples of first camera 270a are described above with referenced to FIG. 2A. First camera 270a is communicatively coupled to first wireless client 240a. First wireless client 240a receives first image 414a or some analysis of first image 414a performed by first camera 270a. Operations represented by block 330a and block 335a may be performed in sequence or simultaneously. For example, the operation represented by block 335a may be conditioned on the success of operation represented by block 330a. Specifically, if first response signal 412a indicates that first RFID tag 260a is present in first inspection zone 290a, then first image 414a of first inspection zone 290a is captured. Otherwise, first image 414a of first inspection zone 290a is not captured. This conditional approach may expedite execution of the overall process.

Method 300 then proceeds with first wireless client 240a generating (referring to block 340a in FIG. 3A) first data feedback 404a. First data feedback 404a is generated based on first response signal 412a and, in some embodiments, based on first image 414a. In some examples, first data feedback 404a comprises first image 414a. Alternatively, first camera 270a and/or first wireless client 240a may analyze first image 414a and first data feedback 404a comprises the analysis of first image 414a. One example of this analysis comprises an output indicating if first image 414a corresponds to first object 280a expected to be presented in first inspection zone 290a.

Method 300 then proceeds with wirelessly transmitting (referring to block 350a in FIG. 3A) first data feedback 404a from first wireless client 240a to first wireless router 230a. This operation may be similar to wirelessly transmitting first data request 402a from first wireless router 230a to first wireless client 240a. Specifically, first data feedback 404a is transmitted over the 60-GHz network provided by wireless routers 230.

One of ordinary skill in the art will appreciate that operations presented by blocks 310a-350a may be repeated as necessary for the presence verification, location and identification of other inspection zones. For example, FIG. 3A illustrates operations presented by block 310b-block 350b, which are applied to second inspection zone 290b. These operations may be executed in the same manner and/or at the same time as corresponding operations described above with referenced to blocks 310a-350a but using a different set of equipment, e.g., second wireless client 240b, second RFID reader 250b, and second camera 270b. Overall, this group of operations may be repeated for each inspection zone in aircraft cabin 100.

Method 300 then proceeds with analyzing (referring to block 360 in FIG. 3A) first data feedback 404a using controller 201 and/or first wireless client 240a to determine if first object 280a is present in first inspection zone 290a. Other aspects of this analysis may include determining an expiration date associated with first object 280a and the like. For example, first response signal 412a is reviewed to determine if an RFID tag code has been retrieved from first inspection zone 290a. If the code has been retrieved, then this retrieved code may be compared to a code associated with first object 280a. Controller 201 may obtain information from database 295 for this comparison. For example, controller 201 may compared the code stored in database 295 for this inspection zone with the retrieved RFID code to determine if the two match. If the codes do not match, then controller 201 may flag this inspection zone for further manual inspection. In some embodiments, database 295 may also contain specific identification of an object associated with this inspection zone and/or the code, expiration date associated with the object, expected location of the object, and the like.

In some examples, the analysis of first image 414a is performed by controller 201 and/or first wireless client 240a. For example, the analysis may involve comparing first image 414a to an image in database 295, which may be a reference image corresponding to first object 280a. Various image analysis techniques are within the scope.

Overall, a combination of information contained in first response signal 412a and first image 414a is used for automated location and identification of an object in first inspection zone 290a, which may or may not be first object 280a. In some instances, first object 280a may be expected to be in first inspection zone 290a but may be actually missing from first inspection zone 290a. First inspection zone 290a may be empty or have another object, which should not be present in first inspection zone 290a.

If the analysis (reflected by block 360) indicates that all received data feedbacks meet certain specified criteria, then, as shown by decision block 380, method 300 may be completed. Alternatively, if the analysis indicates that one or more data feedbacks did not meet the criteria, then, as shown by decision block 380, method 300 may involve manual inspection of aircraft cabin (referring to block 385). More specifically, one or more inspections zones corresponding to the data feedbacks that did not meet the criteria are manually inspected. In this example, the output of the analysis operation may include identification of the inspections zones in aircraft cabin and, in some example, include information about objected expected in these inspection zones.

Figure 3B:
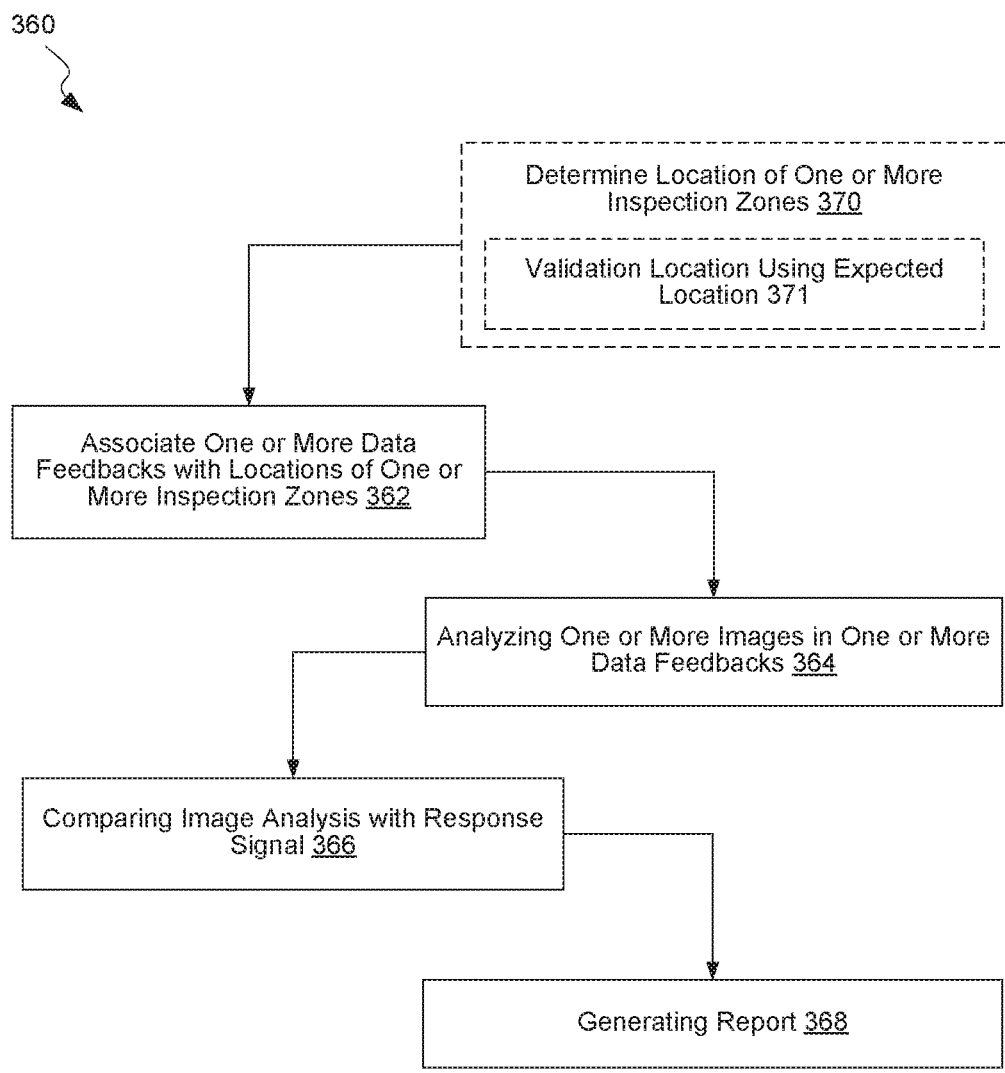
FIG. 3B is a process flowchart corresponding to a data feedback operation, shown as a block in FIG. 3A, in accordance with some embodiments.

FIG. 3B illustrates various aspects of the operation represented by block 360. In some examples, the location of each inspection zone in aircraft cabin 100 is known. For example, the location of each inspection zone may be available in database 295, shown in FIG. 2A and described above. Alternatively, the location of one or more inspection zones in aircraft cabin 100 may not be known or needs to be verified. For example, seats may be added, removed, or relocated in aircraft cabin 100. In this example, the location of some or all inspection zones may be determined during an optional operation represented by block 370. Specific aspect of this operation will now be described with reference to FIGS. 3C and 3D. In this example, the location of first inspection zone 290a is determined using first wireless client 240a and wireless routers 230, such as first wireless router 230a, second wireless router 230b, and third wireless router 230c. A specific example described herein is triangulation, which involves tracing and measurement of a series or a network of triangles between different nodes of the network to determine the distances and relative positions of these nodes.

Figure 3C:
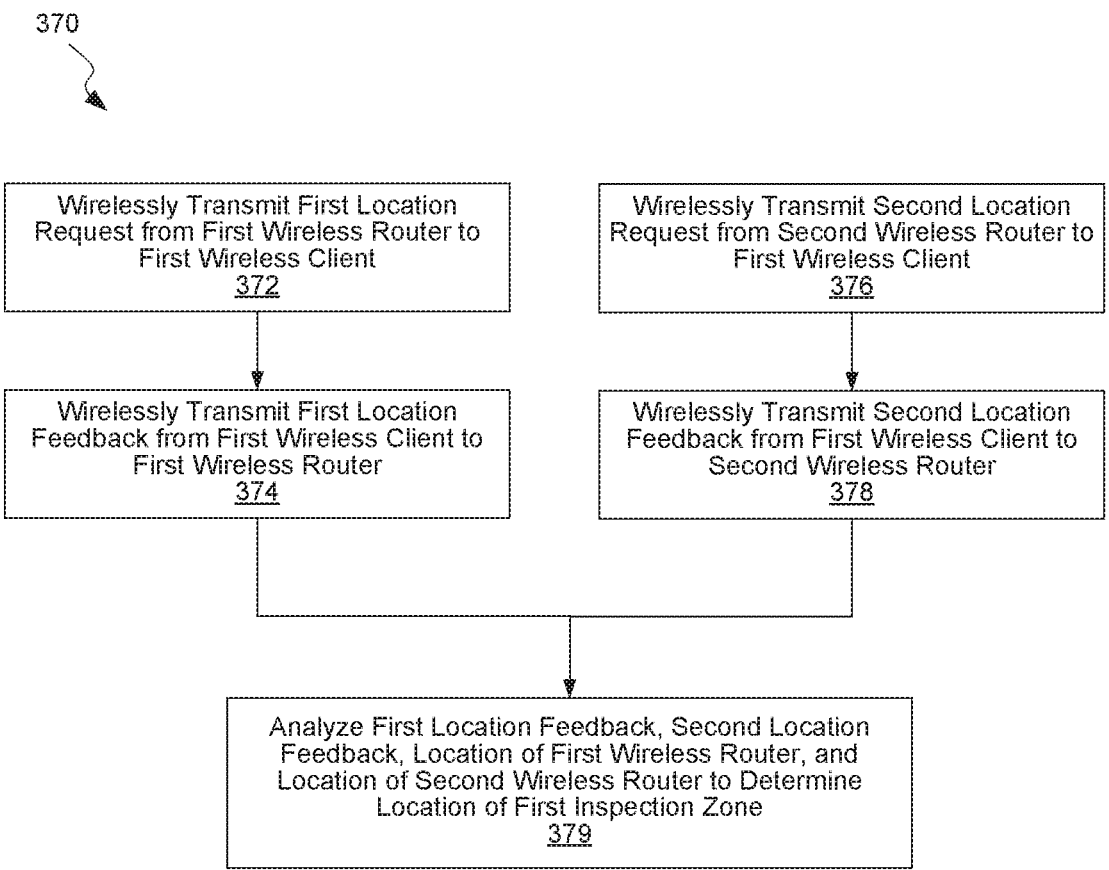
FIG. 3C is a process flowchart corresponding to determining the location of one or more inspection zones in the aircraft cabin, in accordance with some embodiments.
Figure 3D:
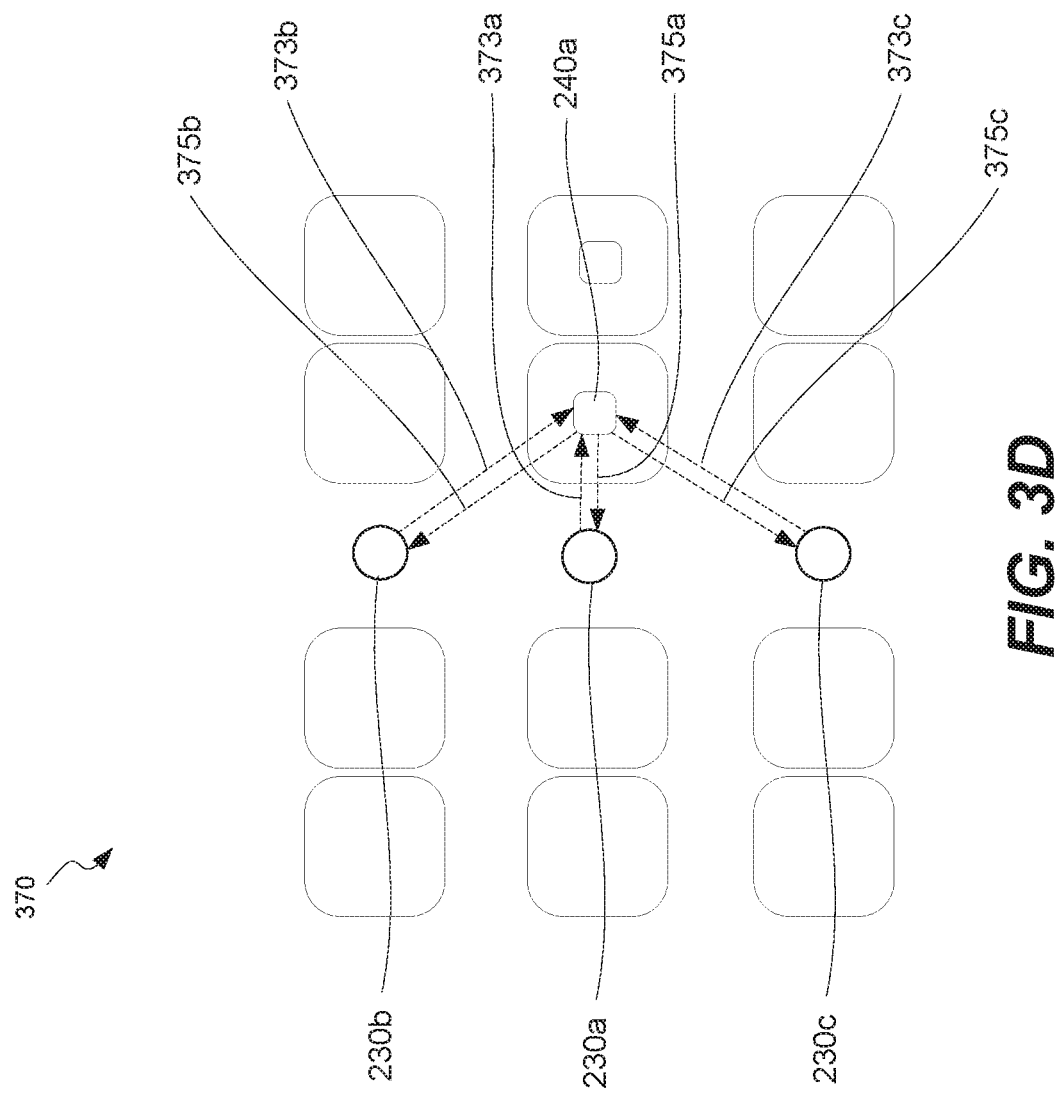
FIG. 3D is a schematic representation of system components and data pathways for determining the location of one or more inspection zones in the aircraft cabin, in accordance with some embodiments.

Referring to FIGS. 3C and 3D, first wireless router 230a wirelessly transmits (referring to block 372 in FIG. 3C) first location request 373a to first wireless client 240a. First location request 373a should not be confused with first data request 402a described above. Furthermore, second wireless router 230b transmits (referring to block 376 in FIG. 3C) second location request 373b to first wireless client 240a. First wireless router 230a and second wireless router 230b are positioned at different locations in aircraft cabin 100 and their locations may be known during this process. In response to these location requests, first wireless client 240a wirelessly transmits (referring to block 374 in FIG. 3C) first location feedback 375a to first wireless router 230a. Specifically, first location feedback 375a is generated by first wireless client 240a upon receipt of first location request 373a from first wireless router 230a. Furthermore, first wireless client 240a wirelessly transmits (referring to block 378 in FIG. 3C) second location feedback 375b to second wireless router 230b. Second location feedback 375b is generated by first wireless client 240a upon receipt of second location request 373b from second wireless router 230b. in some examples, additional wireless routers may transmit location requests to and receive location feedbacks from first wireless router 230a. For example, FIG. 3D illustrates third wireless router 230c transmitting third location request 373c to and receiving third location feedback from first wireless router 230a. Additional wireless routers may be used to increase location accuracy.

First location feedback 375a and second location feedback 375b, as well as the location of first wireless router 230a and second wireless router 230b are analyzed (referring to block 379 in FIG. 3C) to determine the location of first wireless client 240a and, as a result, the location of first inspection zone 290a. For example, the strength of signals, timing, and/or other parameters associated with first location feedback 375a and second location feedback 375b may be analyzed during this operation. Furthermore, this operation may be repeated to determine the location of other inspection zones in aircraft cabin 100.

Similar to wirelessly transmitting data requests and data feedbacks, location requests and location feedbacks may be transmitted using the same 60-GHz network. As stated above, the 60-GHz network is capable of high data transfer rates but also has a smaller range in comparison to LTE and Wi-Fi networks. For example, a distance between a wireless router and a wireless client may less about 10 meters or even less. While this range limitation of the 60-GHz network may be viewed as a disadvantage for other applications, it allows for very precise location of wireless clients inside aircraft cabin 100, e.g., down to a specific seat in aircraft cabin 100. Such precision is generally not available with other types of networks, such as LTE and Wi-Fi networks.

Returning to FIG. 3B, determining the location of first inspection zone 290a may involve validating (referring to block 371 in FIG. 3B) this determined location. For example, database 295 may have some expected location of first inspection zone 290a (e.g., a seat number). During this operation, the determined location may be compared to the expected location for validation. If the two locations match, then the determined location is validated and can be used for analysis of feedbacks from this inspection zone.

Furthermore, the operation represented by block 360 may involve associating (referring to block 362 in FIG. 3B) one or more of data feedbacks with the locations corresponding to these data feedbacks. These locations may be determined earlier (block 370) and/or available from database 395. The association may be used to determine locations of inspection zones with missing objects or other problems and presented in report used for manual inspection of these zones.

The operation represented by block 360 may involve analyzing (referring to block 364 in FIG. 3B) first image 414a provided in first data feedback 404a. The analysis at least involves determining the presence of first object 280a in first inspection zone 290a. For instance, an expected object may be a PFD, which typically has an orange color. The analysis of first image 414a may involve determining presence of the orange color in first image 414a. For example, the positive identification may correspond to a number of pixels in first image 414a having a wavelength of 550-650 nm (mid-yellow to mid-red range) being at least about 50%.

The operation represented by block 360 may involve comparing (referring to block 366 in FIG. 3B) the analysis of first image 414a with the data associated in first response signal 412a. For example, first response signal 412a may include a code obtained from first RFID tag 260a in first inspection zone 290a. The code corresponds to a PFD, e.g., based on the correspondence table in database 295. At the same time, the analysis of first image 414a has yielded that first image 414a also corresponds to a PFD. This comparison effectively confirms that first inspection zone 290a contains a PFD with a correct RFID tag assigned to it. Additional information about this particular PFD (e.g., its expiration date) may be obtained from database 295 based on the code.

The operation represented by block 360 may involve generating (referring to block 368 in FIG. 3B) report 205. For example, if first response signal 412a or first image 414a obtained from first inspection zone 290a do not correspond first object 280a, then report 205 may comprise instructions to manually inspect first inspection zone 290a as described above with reference to block 385 in FIG. 3A.

Examples of Grated Systems

Figure 4A:
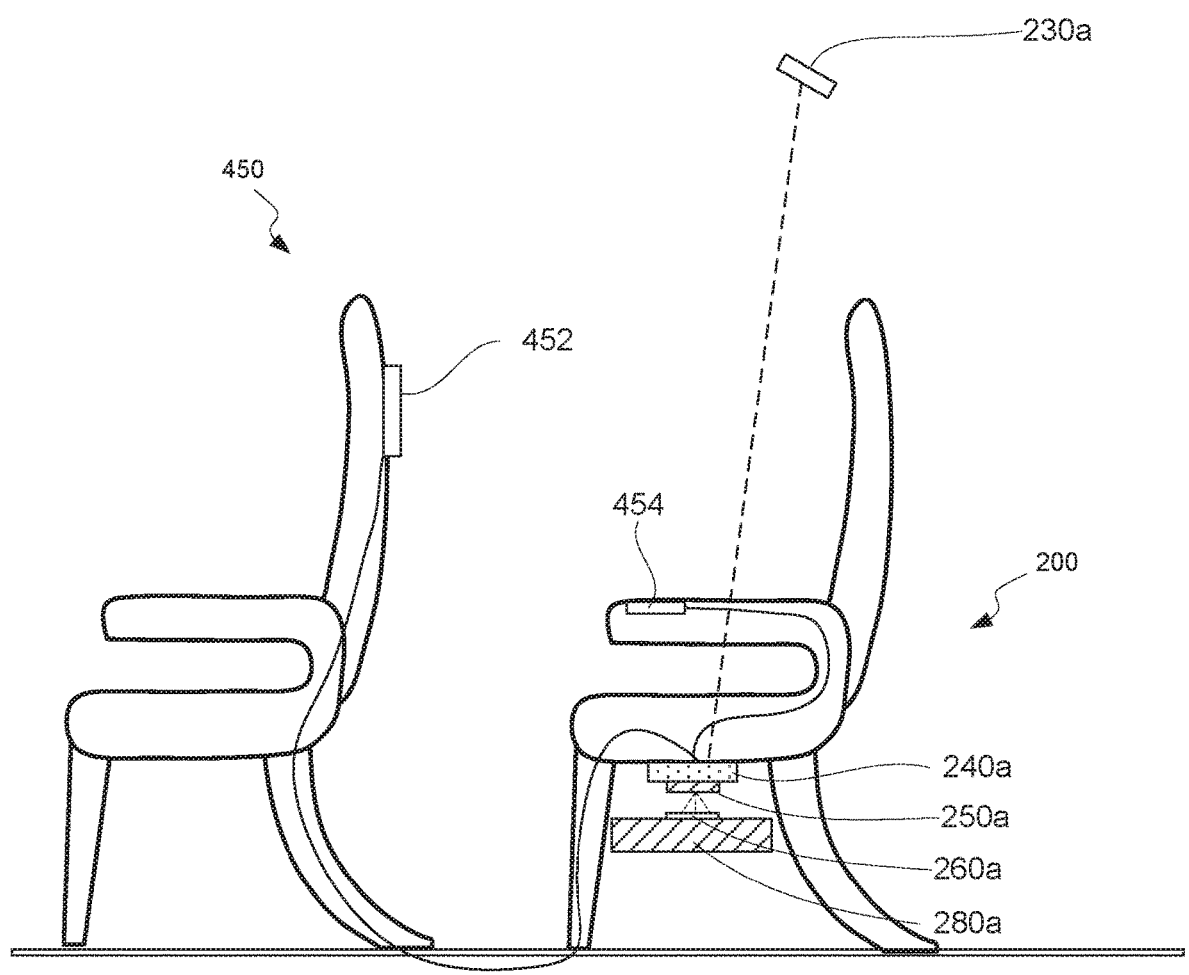
FIG. 4A is a schematic representation of two passenger seats, equipped with various devices of an in-flight entertainment (IFE) system and components of the inspection system, in accordance with some embodiments.

FIG. 4A is a schematic representation of IFE system 450, which may share some components with identification system 200 described below. In this representation, the shared components are first wireless router 230a and first wireless client 240a. Other components of IFE system 450 include display 452 and control unit 454. Display 452 may be mounted in the back of another passenger seat. Display 452 may be controlled by control unit 454 or may have some functions of control unit 454 embedded into display 452, e.g., a touch screen may be used as display 452. Display 452 and/or control unit 454 may be connected to first wireless client 240a and, during operation of IFE system 450, present various requests for IFE data (e.g., movies, music, video games, flight information, and the like).

Figure 4B:
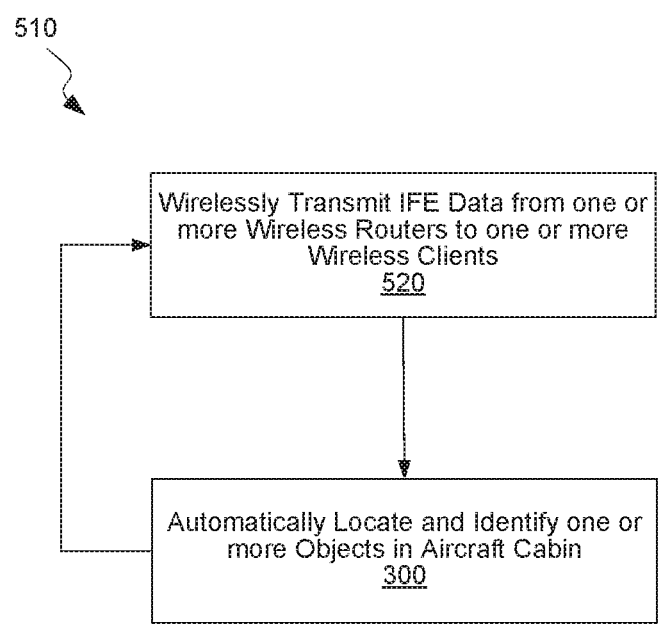
FIG. 4B is a process flowchart involving wireless transmission of IFE data from wireless routers to wireless clients and automated location and identification of multiple objects using the same wireless routers and wireless clients, in accordance with some embodiments.

FIG. 4B is a process flowchart of method 510 of utilizing IFE system 450 and identification system 200 or, more specifically, utilizing shared components of IFE system 450 and identification system 200. These shared components may be utilized at different times. For example, first wireless router 230a and first wireless client 240a may be used for transmission of IFE data when the aircraft has passengers on board. On the other hand, first wireless router 230a and first wireless client 240a may be used for automated location and identification of multiple objects 280 in aircraft cabin 100 before the passengers get on board or after the passengers have left aircraft cabin.

Returning to FIG. 4B, method 510 involves wirelessly transmitting (block 520) of IFE data from one or more wireless routers 230 to one or more wireless clients 240. For example, first wireless router 230a may transmit IFE data to first wireless client 240a based on various requests from a passenger inputted through display 452 and/or control unit 454.

At different times, method 510 involves automatic location and identification of multiple objects, which is method 300 described above. The process may return back to wireless transmission of the IFE data and then go back to automatic location and identification as shown by the loop in FIG. 4B.

Examples of Aircraft

Figure 5:
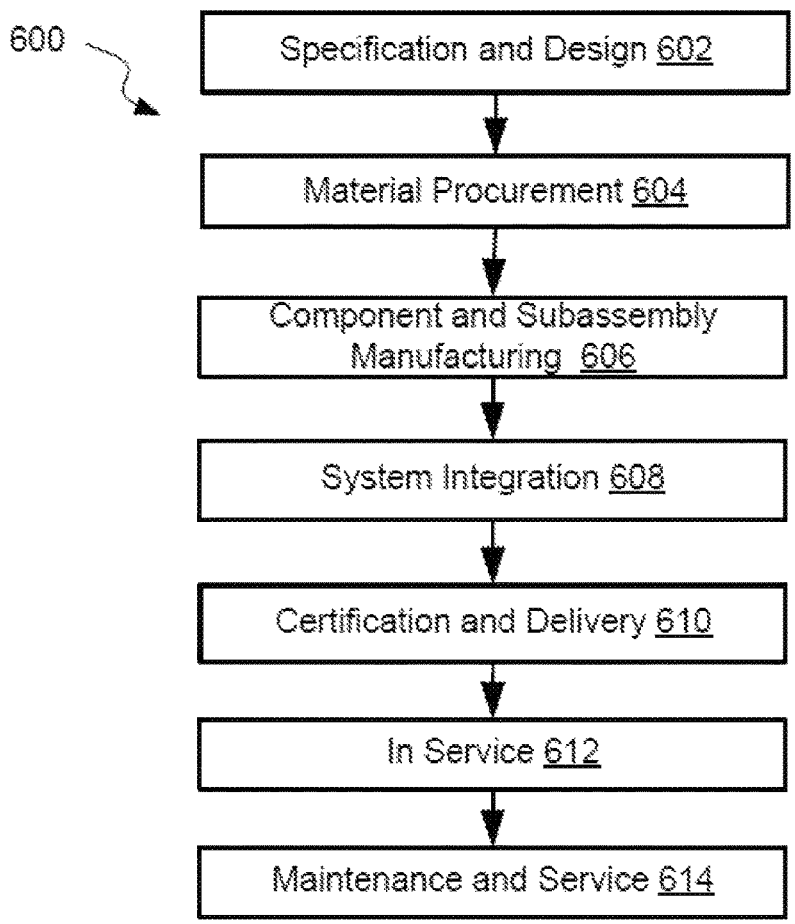
FIG. 5 is a process flowchart reflecting key operations in the life cycle of an aircraft from the early stages of manufacturing to entering service, in accordance with some embodiments.

An aircraft manufacturing and service method 600 shown in FIG. 5 and an aircraft 630 shown in FIG. 6 will now be described to better illustrate various features of processes and systems presented herein. During pre-production, aircraft manufacturing and service method 600 may include specification and design 602 of aircraft 630 and material procurement 604. The production phase involves component and subassembly manufacturing 606 and system integration 608 of aircraft 630. Thereafter, aircraft 630 may go through certification and delivery 610 to be placed in service 612. While in service by a customer, aircraft 630 is scheduled for routine maintenance and service 614 (which may also include modification, reconfiguration, refurbishment, and so on). While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 6:
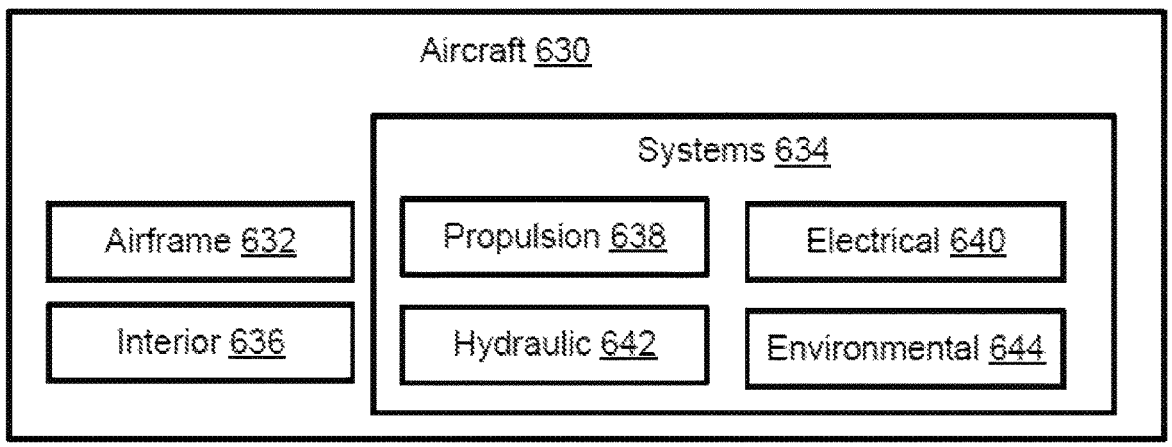
FIG. 6 is a block diagram illustrating various components of an aircraft, in accordance with some embodiments.

As shown in FIG. 6, aircraft 630 produced by aircraft manufacturing and service method 600 may include airframe 632, interior 636, and multiple systems 634 and interior 636. Identification system 200 described above may be a part of interior 636. Examples of systems 634 include one or more of propulsion system 638, electrical system 640, hydraulic system 642, and environmental system 644. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 600. For example, without limitation, components or subassemblies corresponding to component and subassembly manufacturing 606 may be fabricated or manufactured in a manner like components or subassemblies produced while aircraft 630 is in service.

Also, one or more apparatus embodiments, method embodiments, or a combination thereof may be utilized during component and subassembly manufacturing 606 and system integration 608, for example, without limitation, by substantially expediting assembly of or reducing the cost of aircraft 630. Similarly, one or more of apparatus embodiments, method embodiments, or a combination thereof may be utilized while aircraft 630 is in service, for example, without limitation, to maintenance and service 614 may be used during system integration 608 and/or maintenance and service 614 to determine whether parts may be connected and/or mated to each other.

Examples of Controller Computer Systems

Figure 7:
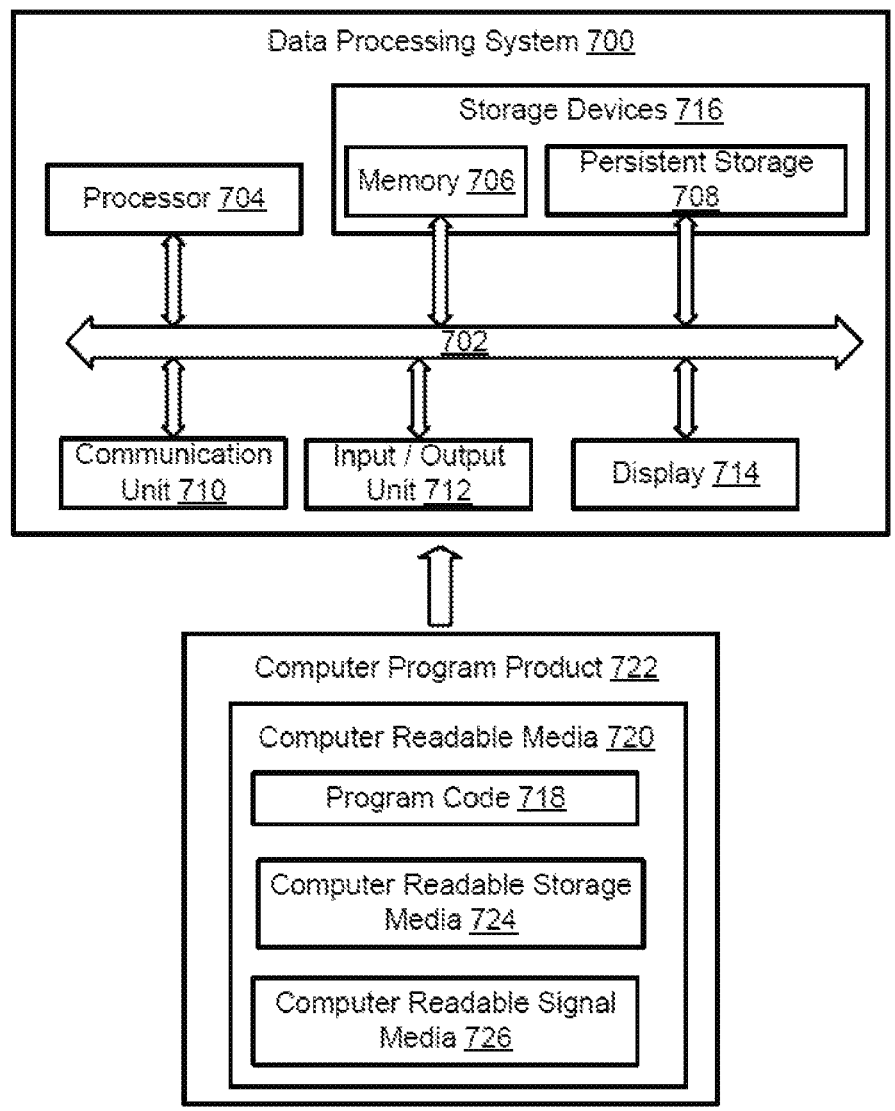
FIG. 7 is a block diagram illustrating a data processing system, in accordance with some embodiments.

Turning now to FIG. 7, an illustration of a data processing system 700 is depicted in accordance with some embodiments. Data processing system 700 may be used to implement one or more computers used in a controller or other components of various systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system. Data processing system 700 may be used to execute one or more operations of method 300 described above, in particular analyzing data feedbacks to determine presence of objects in their respective inspection zones and/or identification of these objects.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random-access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transmitted to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transmitted to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications channels, such as wireless communications channels, optical fiber cable, coaxial cable, a wire, and/or any other suitable type of communications channel.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown.

The different embodiments may be implemented using any hardware device or system capable of running program code 718.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

The invention claimed is:

1. A method for automated location and identification of multiple objects disposed in an aircraft cabin, the method comprising:
   wirelessly transmitting a first data request from a first wireless router to a first wireless client, wherein the first wireless router is one of wireless routers disposed throughout the aircraft cabin, and wherein the first wireless client is one of wireless clients, each one of the wireless clients associated with a different one of the multiple objects;
   transmitting a first interrogation signal using a first RFID reader, communicatively coupled to the first wireless client, wherein the first wireless client instructs the first RFID reader to transmit the first interrogation signal upon receiving the first data request at the first wireless client;
   monitoring a first response signal using the first RFID reader, wherein the first response signal depends on presence of a first RFID tag in a first inspection zone and, if present, information encoded on the first RFID tag;
   capturing a first image of the first inspection zone using a first camera, communicatively coupled to the first wireless client, wherein the first wireless client instructs the first camera to capture the first image of the first inspection zone upon receiving the first data request at the first wireless client;
   generating a first data feedback using the first wireless client, wherein the first data feedback is generated based on the first response signal and the first image;
   wirelessly transmitting the first data feedback from the first wireless client o the first wireless router;
   analyzing the first data feedback to determine at least one of presence of a first object of the multiple objects in the first inspection zone or identification of the first object; and
   determining a location of the first inspection zone based on wirelessly transmitting a first location feedback from the first wireless client to the first wireless router and a second location feedback from the first wireless client to a second wireless router and analyzing the first location feedback, the second location feedback, location of the first wireless router in the aircraft cabin, and location of the second wireless router in the aircraft cabin to determine the location of the first inspection zone.

2. The method of claim 1, wherein wirelessly transmitting the first data request from the first wireless router to the first wireless client is performed over a 60 GHz network.

3. The method of claim 1, wherein the first inspection zone is one of a space under a seat or a space in an overhead compartment in the aircraft cabin.

4. The method of claim 1, wherein the first object is a personal flotation device.

5. The method of claim 1, further comprising wirelessly transmitting inflight entertainment data from the first wireless router to the first wireless client.

6. The method of claim 1, wherein the irst inspection zone is specific to only one seat in the aircraft cabin.

7. The method of claim 1, wherein analyzing the first data feedback comprises analyzing the first image in the first data feedback to determine at least the presence of the first object.

8. The method of claim 7, wherein analyzing the first data feedback further comprises comparing results of analyzing the first image with the first response signal.

9. The method of claim 1, wherein:
   analyzing the first data feedback comprises generating a report validating the presence of the first object in the first inspection zone and the identification of the first object; and
   if one of the presence of the first object in the first inspection zone or the identification of the first object does not meet corresponding predetermined criteria, the report comprises instructions to manually inspect the first inspection zone.

10. The method of claim 9, wherein the predetermined criteria comprise at least one of an indicium associated with the first object or an expiration date associated with the first object.

11. The method of claim 9, wherein the report is generated using an off-board controller positioned outside of the aircraft cabin.

12. The method of claim 9, further comprising, if the report comprises instructions to manually inspect the first inspection zone, manually inspecting the first inspection zone.

13. The method of claim 9, wherein the report comprises validation of the presence of each one of the multiple objects disposed in the aircraft cabin and the identification of each one of the multiple objects.

14. The method of claim 9, wherein the report validates presence of an object corresponding to each of aircraft seats in the aircraft cabin.

15. The method of claim 1, wherein analyzing the first data feedback comprises associating the first data feedback with the location of the first inspection zone in the aircraft cabin.

16. The method of claim 1, wherein determining the location of the first inspection zone further comprises:
   wirelessly transmitting a first location request from the first wireless router to the first wireless client, wherein the first location feedback is generated by the first wireless client upon receipt of the first location request from the first wireless router; and
   wirelessly transmitting a second location request from a second wireless router to the first wireless client wherein the second location feedback is generated by the first wireless client upon receipt of the second location request from the second wireless router.

17. The method of claim 1, wherein determining the location of the first inspection zone comprises validating the location of the first inspection zone using an expected location area of the first inspection zone.

18. A method for automated location and identification of multiple objects disposed in an aircraft cabin, the method comprising:
   wirelessly transmitting a first data request from a first wireless router to a first wireless client, wherein the first wireless router is one of wireless routers disposed throughout the aircraft cabin, and wherein the first wireless client is one of wireless clients, each one of the wireless clients associated with a different one of the multiple objects;

transmitting a first interrogation signal using a first RFID reader, communicatively coupled to the first wireless client, wherein the first wireless client instructs the first RFID reader to transmit the first interrogation signal upon receiving the first data request at the first wireless client;

monitoring a first response signal using the first RFID reader, wherein the first response signal depends on presence of a first RFID tag in a first inspection zone and, if present, information encoded on the first RFID tag;

capturing a first image of the first inspection zone using a first camera, communicatively coupled to the first wireless client, wherein the first wireless client instructs the first camera to capture the first image of the first inspection zone upon receiving the first data request at the first wireless client;

generating a first data feedback using the first wireless client, wherein the first data feedback is generated based on the first response signal and the first image;

wirelessly transmitting the first data feedback from the first wireless client to the first wireless router;

analyzing the first data feedback to determine at least one of presence of a first object of the multiple objects in the first inspection zone or identification of the first object;

wirelessly transmitting a second data request from a second wireless router to a second wireless client, wherein the second wireless router is one of the wireless routers, and wherein the second wireless client is one of multiple wireless clients, transmitting a second interrogation signal using a second RFID reader, communicatively coupled to the second wireless client, wherein the second wireless client instructs the second RFID reader to transmit the second interrogation signal upon receiving the second data request at the second wireless client;

monitoring a second response signal using the second RFID reader, wherein the second response signal depends on a presence of a second RFID tag and information encoded on the second RFID tag in a second inspection zone, and wherein the second inspection zone does not overlap with the first inspection zone;

capturing a second image of the second inspection zone using a second camera, communicatively coupled to the second wireless client, wherein the second wireless client instructs the second camera to capture the second image of the second inspection zone upon receiving the second data request at the second wireless client;

generating a second data feedback using the second wireless client, wherein the second data feedback is generated based on the second response signal and the second image;

wirelessly transmitting the second data feedback from the second wireless client to the second wireless router; and analyzing the second data feedback to determine at least one of presence of a second object of the multiple objects in the second inspection zone or identification of the second object.

19. The method of claim 18, wherein monitoring the second response signal using the second RFID reader and monitoring the first response signal using the first RFID reader overlap in time.

20. The method of claim 18, wherein analyzing the first data feedback and analyzing the second data feedback overlap in time and are performed using one controller.

21. The method of claim 18, wherein:
the first inspection zone and the second inspection zone correspond to areas under adjacent passenger seats in the aircraft cabin,
the first inspection zone is outside of an operating range of the second RFID reader, and
the second inspection zone is outside of an operating range of the first RFID reader.

22. An identification system for automated location and identification of multiple objects disposed in an aircraft cabin, the identification system comprising:
a first wireless router, positioned in the aircraft cabin;
a second wireless router, positioned in the aircraft cabin;
a first wireless client, positioned in the aircraft cabin closer to the first wireless router than to the second wireless router, wherein the first wireless client is configured to wireless communicate with the first wireless router and with the second wireless router;
a second wireless client, positioned in the aircraft cabin closer to the second wireless router than to the first wireless router, wherein the second wireless client is configured to wireless communicate with the first wireless router and with the second wireless router;
a first RFID reader, communicatively coupled to the first wireless client, wherein the first RFID reader defines a first inspection zone;
a second RFID reader, communicatively coupled to the second wireless client, wherein the second RFID reader defines a second inspection zone, not overlapping with the first inspection zone;
a first camera, communicatively coupled to the first wireless client and configured to capture an image of the first inspection zone; and
a second camera, communicatively coupled to the second wireless client and configured to capture an image of the second inspection zone,
wherein the first wireless client is configured to generate first data feedback from a first response signal received from the first RFID reader and a first image received from the first camera, and
wherein the second wireless client is configured to generate second data feedback from a second response signal received from the second RFD reader and a second image received from the second camera.

23. The identification system of claim 22, further comprising a controller, communicatively coupled to the first wireless router and to the second wireless router, wherein:
the controller is configured to analyze the first data feedback received from the first wireless client to determine at least one of:
presence of a first object of the multiple objects in the first inspection zone, and
identification of the first object; and
the controller is configured to analyze the second data feedback received from the second wireless client to determine at least one of:
presence of a second object of the multiple objects in the second inspection zone, and
identification of the second object.

24. The identification system of claim 23, wherein the controller is an off-board controller positioned outside of the aircraft cabin.

25. The identification system of claim 23, wherein the controller is further configured to associate the first data feedback with location of the first inspection zone and to associate the second data feedback with location of the second inspection zone.

\* \* \* \* \*